(12) United States Patent
Schiller

(10) Patent No.: US 8,245,269 B2
(45) Date of Patent: Aug. 14, 2012

(54) SYSTEM AND METHOD FOR DELIVERING VIDEO PROGRAMS TO A VIDEO DISTRIBUTION CENTER

(75) Inventor: Jay Schiller, Denver, CO (US)

(73) Assignee: ARRIS Solutions, Inc., Suwanee, GA (US)

( * ) Notice: Subject to any disclaimer, the term of this patent is extended or adjusted under 35 U.S.C. 154(b) by 1023 days.

(21) Appl. No.: 10/877,856

(22) Filed: Jun. 25, 2004

(65) Prior Publication Data

US 2005/0289636 A1  Dec. 29, 2005

(51) Int. Cl.
*H04N 7/16* (2011.01)

(52) U.S. Cl. ............. 725/142; 725/87; 725/86; 725/135

(58) Field of Classification Search ............... 725/61, 725/46, 86, 103, 102, 425, 142; 345/327
See application file for complete search history.

(56) References Cited

U.S. PATENT DOCUMENTS

| | | | |
|---|---|---|---|
| 5,850,218 A * | 12/1998 | LaJoie et al. | 725/45 |
| 5,892,535 A * | 4/1999 | Allen et al. | 725/36 |
| 6,782,553 B1 * | 8/2004 | Ogawa et al. | 725/146 |
| 6,802,074 B1 * | 10/2004 | Mitsui et al. | 725/25 |
| 7,207,055 B1 * | 4/2007 | Hendricks et al. | 725/95 |
| 7,471,876 B2 * | 12/2008 | Tsukidate | 386/83 |
| 2003/0135857 A1 * | 7/2003 | Pendakur et al. | 725/61 |
| 2003/0140353 A1 * | 7/2003 | Hugenberg et al. | 725/148 |
| 2004/0010807 A1 * | 1/2004 | Urdang et al. | 725/136 |
| 2004/0025181 A1 * | 2/2004 | Addington et al. | 725/58 |
| 2004/0034629 A1 * | 2/2004 | Genser | 707/3 |
| 2004/0040035 A1 * | 2/2004 | Carlucci et al. | 725/32 |
| 2004/0168184 A1 * | 8/2004 | Steenkamp et al. | 725/31 |
| 2004/0226051 A1 * | 11/2004 | Carney et al. | 725/135 |
| 2005/0188108 A1 * | 8/2005 | Carter et al. | 709/239 |

* cited by examiner

*Primary Examiner* — Hai V Tran
*Assistant Examiner* — Junior Mendoza
(74) *Attorney, Agent, or Firm* — Troy A. Van Aacken; Robert J. Starr

(57) ABSTRACT

Embodiments of the present invention are systems and methods for delivering video programs to a video distribution center. An embodiment of the invention is a method for delivering video programming to a distribution center that provides broadcast programming and store-and-forward programming, such as video on demand based on video programming recorded at the distribution center. The method comprises sending a plurality of video programs to the distribution center. Wherein, the plurality of video programs is to be provided as broadcast programming by the distribution center. The method also comprises sending ancillary data to the distribution center. The ancillary data includes business rules that include permission for the distribution center to record one or more selected video programs of the plurality of video programs.

20 Claims, 4 Drawing Sheets

SYSTEM AND METHOD FOR DELIVERING VIDEO PROGRAMS TO A VIDEO DISTRIBUTION CENTER

FIELD OF THE INVENTION

The present invention relates to the field of delivering audio-visual information to a video distribution center.

BACKGROUND OF THE INVENTION

A video distribution center provides two kinds of services to viewers, broadcast programming and store-and-forward programming. An example of a video distribution center is a master headend for a cable and/or a satellite company. The broadcast programming is a continuous stream of video programs that are presented to viewers as a single channel such as HBO, Showtime, or Starz. The video distribution center multiplexes a plurality of broadcast programs into a plurality of TV channels thus giving viewers a choice of what broadcast programming they wish to watch. The video distribution center also provides viewers with store-and-forward programming, which includes interactive programming such as Video-On-Demand (VOD). When providing VOD programming, the video distribution center provides a particular video program when it receives a specific request for the particular video program and multiplexes the specific requests. VOD gives the viewer control over when they wish to view the particular video program.

The video distribution center receives the broadcast programming from one or more content providers, which may be a content programmer or a content aggregator. Examples of content programmers are ESPN, HBO, Showtime and Starz. The content provider sends the broadcast programming to the distribution center as a continuous stream that is redistributed to viewers with little or no modification. Each content provider may send multiple streams of broadcast programming to the distribution center. The master headend does not record the video programs but merely rebroadcasts them as broadcast programming to viewers.

The video distribution center also receives the store-and-forward programming from one or more of the same content providers, which may be a content programmer or a content aggregator. Examples of content programmers are ESPN, HBO, Showtime and Starz. The content providers send the store-and-forward programming to the distribution center as data files where they are received and stored for later playback to viewers. They are redistributed to viewers from video server computers in the distribution centers at a later time. Store-and-forward programming is programming that is streamed from the distribution center based on video programs that are stored at the distribution center. Interactive programming, such as VOD, is store-and-forward programming that is played from the video server in response to the viewer's requests. The video programs are based on video files and ancillary data, called metadata, that may include business rules, and promotional material that are "pitched" (transmitted) by the content provider to a "catcher's mitt" in the distribution center. The catcher's mitt is a computer located at the video distribution center that receives the video file and the ancillary data associated with the video file and then passes the information along to the appropriate systems in the video distribution center such as a video server and a content manager. The video server creates a store-and-forward program based on the video file. The store-and-forward program can include special features that allow it to be used as VOD programming. Other store-and-forward applications include near VOD (NVOD), PPV or even programming played from the video server at the distribution center that appears to the viewer as broadcast programming. The content manager is a software program that manages the video programs and the ancillary data associated with the video programs. The content manager also ensures that the business rules are obeyed.

One of the problems with this approach is the high bandwidth required by the content provider for sending the same programming as both broadcast programming and as store-and-forward programming, such as VOD. For example, HBO broadcasts The Sopranos on Sunday night as broadcast programming and separately distributes it as store-and-forward programming, for VOD. The video distribution system receives the same content as both broadcast programming and store-and-forward programming but over two separate distribution paths. The paths are the programmer's broadcast signal and the pitching and catching network. In addition, the catcher's mitt needs to be provisioned with enough bandwidth and memory to handle video programs being pitched to it. With the advent of HDTV and the offering of additional store-and-forward content this pitching and catching becomes a more expensive and less scaleable proposition. Therefore, what is needed are improved content distribution and video distribution systems for delivering video programming to a distribution center that provides broadcast programming and store-and-forward programming. It is towards this end that the present invention is directed.

BRIEF SUMMARY OF THE INVENTION

Embodiments of the present invention are systems and methods for delivering video programs to a video distribution center. An embodiment of the invention is a method for delivering video programming to a distribution center that provides broadcast programming and store-and-forward programming. The method comprises sending one or more video programs to the distribution center. The one or more video programs are to be provided as broadcast programming. The method also comprises sending ancillary data to the distribution center. The ancillary data includes business rules that include permissions for the distribution center to record one or more selected video programs among the one or more video programs, to be provided as store-and-forward programming to viewers.

DETAILED DESCRIPTION OF THE INVENTION

Embodiments of the present invention are systems and methods for delivering video programs to a distribution center and for receiving video programs by the distribution center. A video program is sent to the distribution center for redistribution to viewers as broadcast programming. Ancillary data associated with the video program is also sent to the distribution center. The ancillary data includes business rules that give the distribution center permission to record the video program, store the video program, and distribute the video program as store-and-forward programming. By reducing the need to deliver the video program that is used for both broadcast programming and store-and-forward programming multiple times via multiple paths the present invention allows for the conservation of resources associated with the delivery of video programs from the content provider to the distribution center, as well as at the distribution center. With this invention, all programming is sent to the distribution center as broadcast programming but can be provided to viewers as both broadcast programming and store-and-forward programming.

Figure 1:
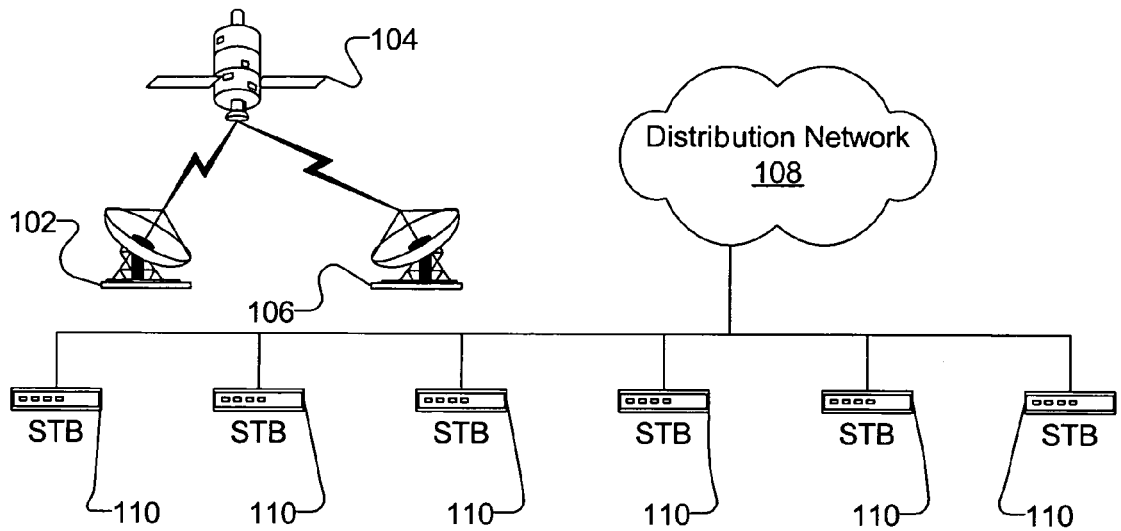
FIG. 1 is an illustration of a system for distributing video programs to viewers in which embodiments of the invention may be practiced.

FIG. 1 shows a distribution system in which an embodiment of the invention may be practiced. As shown in FIG. 1 a content provider 102 may send video programs to a video distribution center 106 via a satellite 104. The content provider 102 may use other communication means such as a public network, e.g., the internet, a leased communication line, a virtual private network, a radio link, a microwave link, an optical link, optical media, magnetic media or some other means for delivering data from the content provider 102 to the distribution center 106. The distribution center 106 then redistributes the video programs to a plurality of set top boxes (STB) 110 via a distribution network 108. The STB 110 is any device that may be used to interpret the data provided by the distribution center 106 and present video programs representative of the data to one or more viewers of the STB 110. The STB 110 may be an interface for providing interactive services to viewers such as VOD.

The distribution center 106 provides broadcast programming as well as store-and-forward programming to viewers. The store-and-forward programming is based on programming recorded or partially recorded at the distribution center 106 and may include Video-On-Demand (VOD), Near-Video-On-Demand (NVOD), and Pay-Per-View (PPV) and any service provided to viewers other than broadcast programming that uses a recorded or partially recorded video program as its basis. VOD is a technique for providing a particular video program when the subscriber requests the particular video program. The subscriber may also be able to perform trick functions on the particular video program such as pause, rewind, fast-forward, etc. NVOD is technique for providing a particular video program on multiple channels with staggered start times. This gives the viewer more choices on when times they wish too view the particular video program. PPV is a technique for providing a particular video program to viewers but only allowing the viewer to view the particular video program after the viewer has authorized the distribution center to charge the viewer's account.

The store-and-forward programming makes use of ancillary data. The ancillary data may be incorporated into the particular video program or a stream of content that includes the particular video program. The ancillary data and the broadcast programming may be combined by creating a single data stream prior to sending. Alternatively, the ancillary data and the broadcast programming for a single program may be multiplexed, for example by sending them in a Single Program Transport Stream (SPTS) or a Multiple Program Transport Stream (MPTS). In another embodiment, the ancillary data and the broadcast programming may be sent separately; the ancillary data may be sent in a separate SPTS or MPTS or as one or more data files. Alternatively, the ancillary data maybe sent by separate transmission media such as the Internet or by any means that allows the distribution center to receive the ancillary data.

The ancillary data may include data normally associated with the transmission of video programs to the distribution center that are used to create store-and-forward programming such as VOD programming. Examples of ancillary data are business rules that restrict the use of the video programs, promotional material and any material that is relevant to the retransmission of the video programs as store-and-forward programming. The ancillary data may be divided into multiple parts. The ancillary data that is time sensitive, such as permission to record, may be sent before the particular video program is sent, while other ancillary data may be sent later.

Promotional material is any material that the distribution center 106 may use to promote and/or describe the video programs. Examples of promotional material include: descriptive information that may be presented to viewers deciding what to watch; descriptive information about the video programs in one or more languages; trailers; still pictures; video clips; ratings; interviews; lists of individuals involved in the production of the video programs, and commercials.

The business rules may indicate that the distribution center may not record the particular video program or may include specific instructions to record the particular video program. The business rules may limit what store-and-forward programming (such as VOD, NVOD, or PPV) that the distribution center may provide using the particular video program. The business rules may place limitations on who may receive a particular store-and-forward program based on the particular video program. The business rules may limit when the particular store-and-forward program may be provided to viewers. The business rules may require that the particular store-and-forward program only be provided to the subset of viewers that subscribe to the broadcast programming of which the particular video program is a part of. The business rules may require that the particular store-and-forward program only be provided to the viewers during some specified period of time after the particular video program is delivered to viewers as broadcast programming. The business rules may require that the distribution center remove a recorded video program and anything derived from the recorded video program after a specified period.

The business rules may take the form of a pre-defined data structure that includes: a means for identifying the video program to which it pertains; a flag or instruction indicating whether or not the distribution center 106 may record the video program; flags or instructions indicating what services the distribution center 106 may provide using the video program; time periods over which the distribution center 106 may provide said services; costs to the distribution center 106 for providing said services; and suggested prices to charge the subscriber for using said services. The business rules need not include all of these elements.

The distribution center 106 may require a minimum lead-time before the particular video program is sent to the distribution center 106 to allocate resources for recording the particular video program. Therefore, the distribution center 106 may require that it receive permission, which is included as part of the ancillary data, to record the particular video program a set amount of time before the distribution center receives the particular video program. Alternatively, the distribution center 106 may temporarily record some or all of the video programs it receives in anticipation of being given permission to record the video program. If the distribution center 106 does not receive permission to record a video program that it has temporarily recorded (or partially recorded) then the distribution center may delete the temporary recording (and stop recording it if it was only partially recorded). Another alternative is to include a portion of the ancillary data as the first part of the video program, which the distribution center 106 uses to determine whether to record the remainder of the program.

If the distribution center 106 is unable to record the video program, then the distribution center 106 may send a message to the content provider 102 informing the content provider 102 that it was unable to record a particular video program. The distribution center 106 may be unable to record the video program because of equipment failure, lack of recording bandwidth or because of lack of storage capacity.

The distribution center 106 may also receive video programs 206 and ancillary data 204 through a secondary distribution channel. For instance, the distribution center 106 might download a particular video program if it was unable to record the particular video program. The inability to record the particular video program may be because of a lack of resources at the distribution center 106, an error in the data stream 202, or because the distribution center never received the particular video program as broadcast programming.

Figure 2:
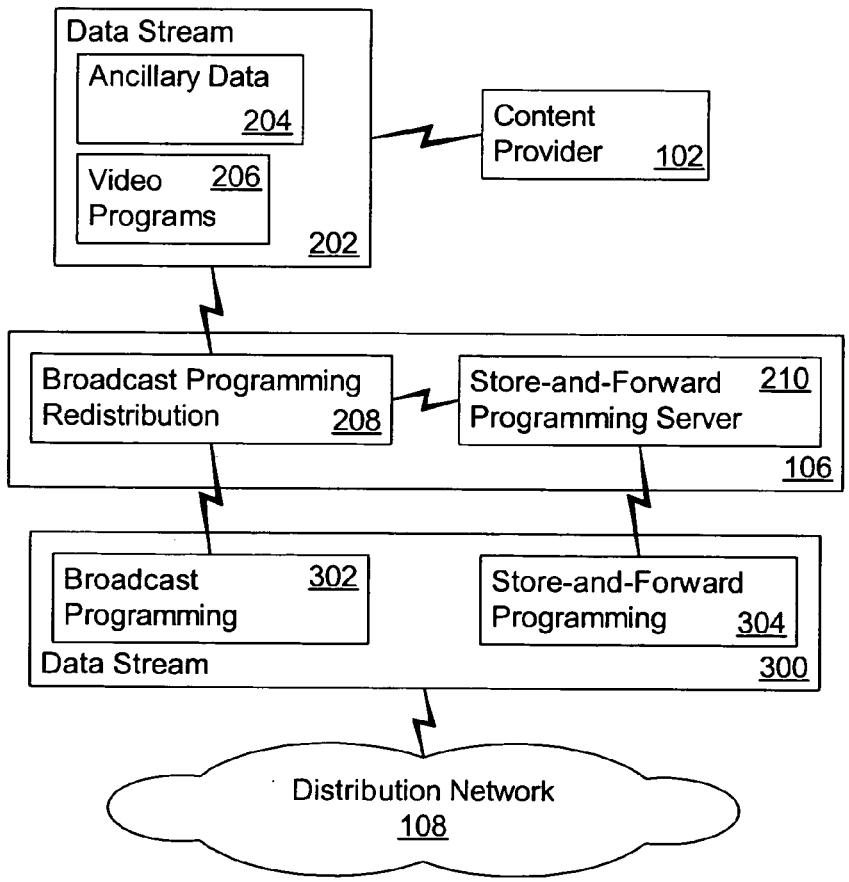
FIG. 2 is an illustration how of data may be distributed to a distribution center in an embodiment of the present invention.

FIG. 2 is an illustration of how video programs might be distributed in an embodiment of the invention. The content provider 102 provides a first data stream 202 to the distribution center 106. The first data stream 202 includes ancillary data 204 and one or more video programs 206. For example, the ancillary data 204 may be multiplexed with the one or more video programs 206. The distribution center 106 includes a broadcast programming distribution system 208 for receiving the video programs 206 in the data stream 300 and redistributing the video programs 206 to the plurality of STBs 110 via the distribution network 108 without first storing them. In other words, they are distributed as broadcast programming 302. The ancillary data 204 may be forwarded to systems such as a store-and-forward programming server 210 (e.g., a video server), located at the distribution center 106 for incorporation into a database and/or for re-packaging to be distributed to viewers. The distribution center 106 provides the viewers with a second data stream 300 that includes store-and-forward programming 304 recorded from the broadcast programming 302. The business rules contained within the ancillary data 204 guide what actions the distribution center 106 takes regarding the video programs 206.

If it is within the permissions accorded to the distribution center 106 by the business rules, the distribution center 106 will record selected ones of the video programs 206 and store them at the store-and-forward programming server 210. For this purpose, the server 210 includes mass storage. The server 210 may process the content 206 in preparation for transmitting the content 206 to the STB 110 as a store-and-forward program via the distribution network 108. The server 210 may store the processed content for latter distribution as a store-and-forward programming via the distribution network 108. The distribution center 106 ensures that the video programs 206 are used in a manner that is in accordance with the business rules included in the ancillary data 204. Thus, some of or all of the same programs which are received as broadcast programming for distribution to viewers without first being stored are also provided to viewers as store-and-forward programming.

In an embodiment of the invention, the ancillary data 204 may include a reference (e.g., a ftp site) from which the distribution center 106 may retrieve additional ancillary data 204. This allows the distribution center 106 to retrieve only the ancillary data 204 that is needed, when it is needed, thus conserving bandwidth and other resources. This also allows the content provider 102 to alter the ancillary data 204 relevant to video programs 206 previously sent to the distribution center 106. The content provider 102 may send a message to the distribution center 106 when the ancillary data 204 is altered. Alternatively, the distribution center 106 may check for changes in the ancillary data 204 on a regular basis or when the ancillary data 204 is about to be used. If stored separately from the corresponding program, the ancillary data 204 is or is part of a separate file that includes a reference to a particular video program 206, to which the ancillary data 204 is relevant. The video programs 206 may each be identified by a unique name, an identification number and/or date, time and channel of transmission so that ancillary data 204 can refer to them.

In an embodiment of the invention, the ancillary data 204 may include instructions to record particular video programs 206 and redistribute the particular video programs 206 at particular dates and times. For example, the ancillary data 204 may include a reference to one or more particular video programs 206 previously sent to the distribution center 106 and stored therein and instructions for including the one or more referenced video programs 206 in a stream of video programs distributed to STB 110. The viewer will perceive this stream of video programs as broadcast programming from the content provider 102 when in fact it is an example of store-and-forward programming created at the distribution center 106. The instructions included in the ancillary data may include for example: times at which the video programs 206 should be distributed to viewers; sets of viewers that may view the video programs 206; geographical regions that may view the video programs 206; and/or channels on which the video programs 206 may be presented to viewers.

Figure 3:
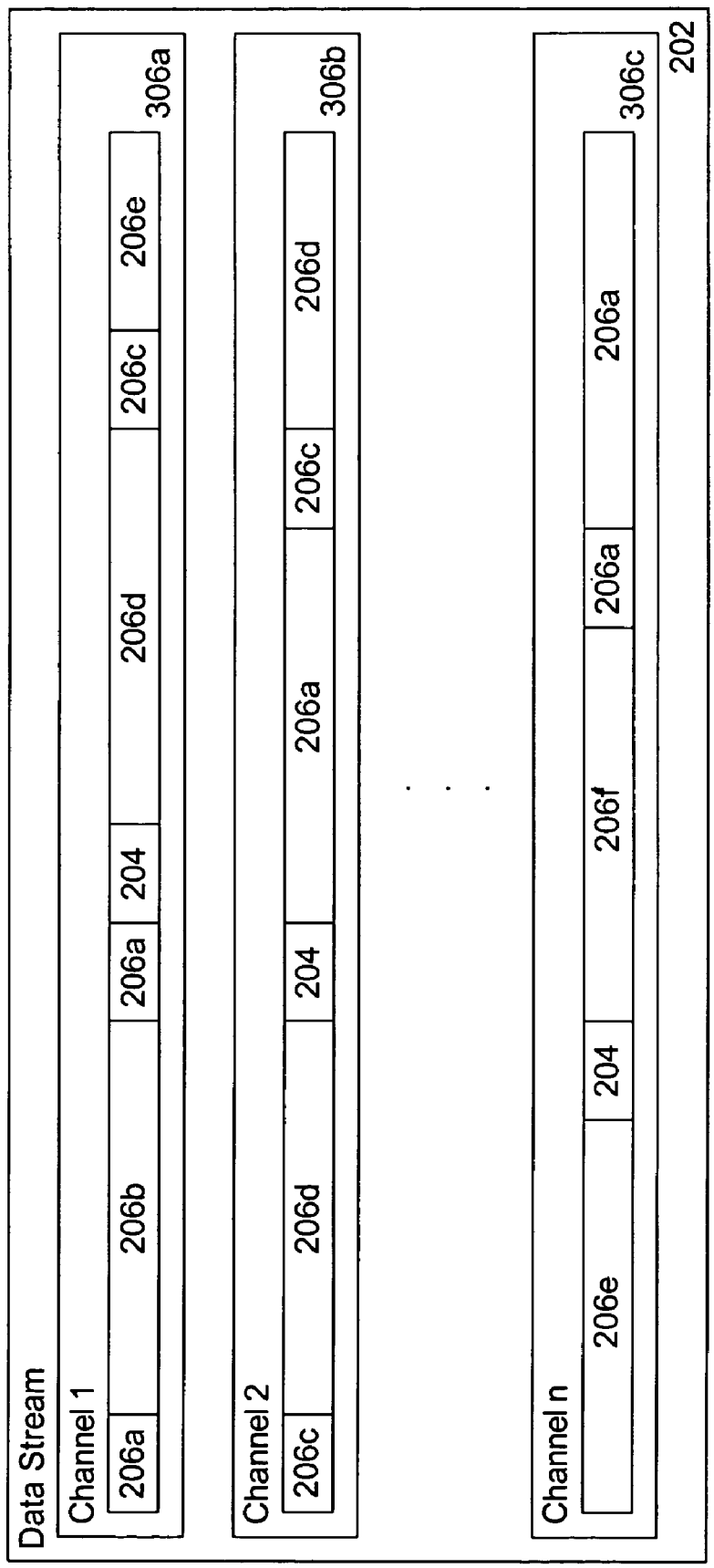
FIG. 3 is an illustration of broadcast programming as may be used in an embodiment of the present invention.

FIG. 3 is an illustration of the data stream 202 that may be used in an embodiment of the invention. The data stream 300 of FIG. 2 maybe organized in a similar manner to the data stream 202 as shown in FIG. 3. The data stream 202 may be delivered as separate channels of data or as multiple channels that are multiplexed together or sent in parallel. The data stream 202 may be organized as one or more channels 306*a-c* of broadcast programming. The distribution center may organize the data stream 300 such that the broadcast programming 302 and the store-and-forward programming 304 are presented to viewers as one or more channels. The content in each individual channel may be divided up into a series of packets that are transmitted as a Single Program Transport Stream (SPTS). A series of channels may be multiplexed together and transmitted as a Multi-Program Transport Stream (MPTS). The series of channels may be multiplexed together by any technique including but not limited to frequency division multiplexing, time division multiplexing, statistical time division multiplexing, and wavelength division multiplexing.

The broadcast programming 302 and the store-and-forward programming 304 includes video programs 206, which are sent to the viewers in a data stream 300. The video programs 206 and the ancillary data 204 are multiplexed together and sent to the distribution center 106 by the content provider 102 as data stream 202. The data stream 202 is sent to the distribution center 106 as a plurality of channels 306*a-c* with a temporal series of video programs 206 along with ancillary data 204 on each channel. Each channel 306*a-c* includes a series of video programs 206 and ancillary data 204. For example, channel 302*a* may include: a trailer 206*a*, followed by a movie 206*b*, the trailer 206*a*, ancillary data 204, a second movie 206*d*, a commercial 206*c* and a movie 206*e*. A video program, such as trailer 206*a*, may be repeated multiple times on one or more channels. A particular video program may include ancillary data 204 that may be removed from the video program 206 by the distribution center 106 before the video program 206 is presented to the viewers as data stream 300. Alternatively, the ancillary data 204 is not removed, but is not presented to the viewers. When a viewer has interactive control over a particular program, the portion of the data stream 300 that includes the particular program is controlled by the viewer.

Figure 4:
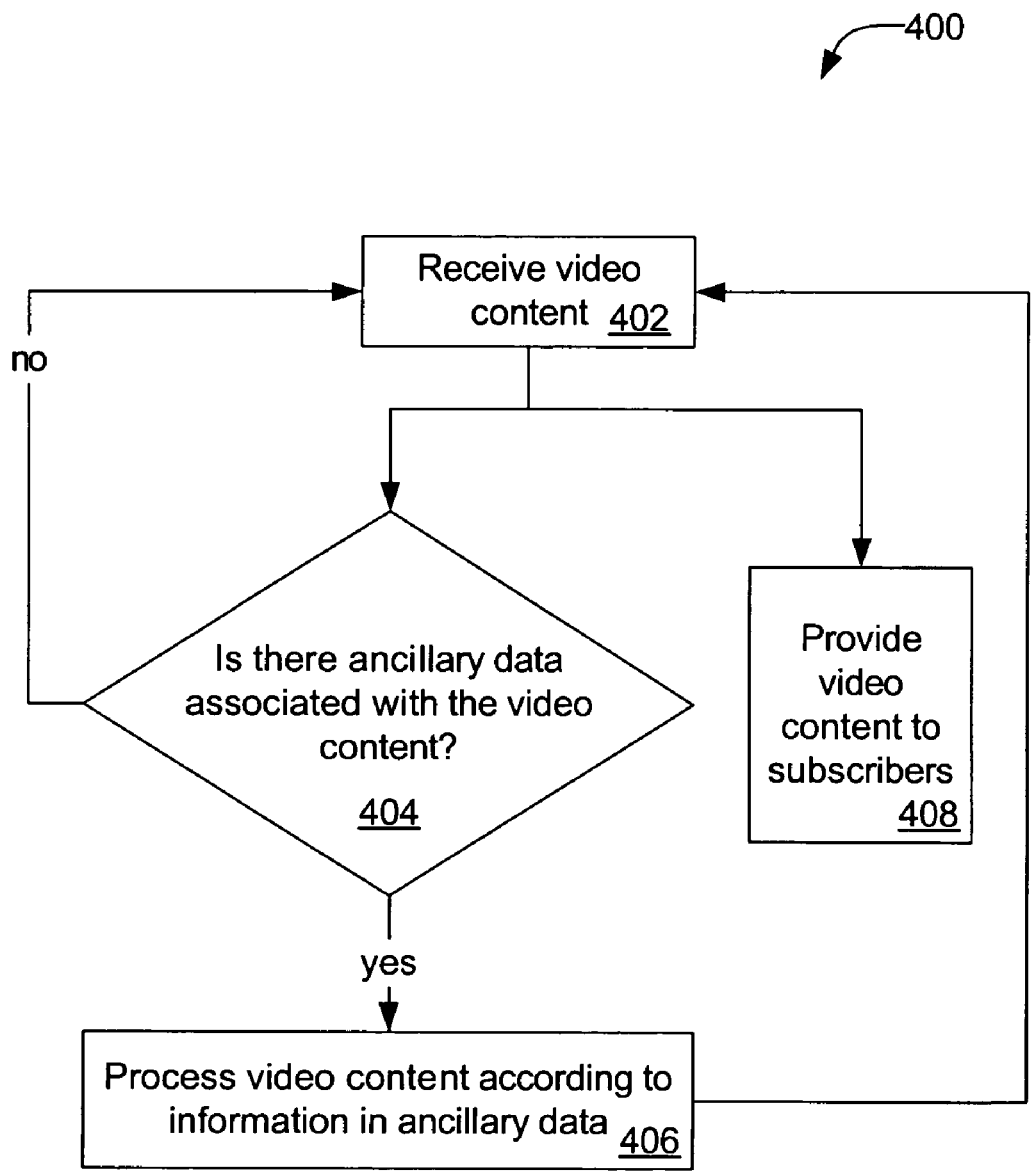
FIG. 4 is a flowchart of a method of receiving video programs in accordance with an embodiment of the present invention.

FIG. 4 is a flowchart 400 of a method of receiving a video program in accordance with an embodiment of the invention. Flowchart 400 is performed for each video program as it is received by the distribution center 106. As shown in flowchart 400 the distribution center 106 begins to receive the video program in step 402. The distribution center 106 may determine if it has the right to record the video program in a step 404. The distribution center 106 makes this determination by inspecting the ancillary data 204 (FIG. 2) that is associated with the video program.

The distribution center 106 may have received the ancillary data 204 before the video program was sent. Alternatively, the ancillary data 204 may be received at the same time as the video program or may be included with the video program. The distribution center 106 may check an external server to determine if it has the right to record the video program.

If there is ancillary data 204 associated with the video program then the distribution center 106 will process the video program as it is received in step 406 according to the business rules included in the ancillary data 204. The business rules set out the rights and privileges assigned to the distribution center 106 by the content provider 102 relevant to the video program. The distribution center 106 includes hardware and/or software that ensure that the distribution center 106 obeys the business rules. In addition, the distribution center 106 may create a log that may be protected against alteration for enabling an audit to be performed on the distribution center's 106 adherence to the business rules.

If the business rules give the distribution center 106 the right to record a particular one or selected ones of the video programs, then the distribution center 106 may record and store those video programs. If the business rules give the distribution center 106 the right to deliver a particular one or selected ones of the video programs as store-and-forward programming such as a VOD program, then the distribution center 106 may process the particular one or the selected one of video programs and prepare it for delivery as store-and-forward programming such as VOD content. If the business rules limit the time period during which the distribution center 106 may store a particular one or selected ones of the video programs then the distribution center 106 will delete the video programs, and any content that used the video programs as a source, such as VOD content, once the time period has expired. Alternatively, each video program on one or more channels 302*a-c* may be recorded unless the distribution center 106 is instructed otherwise. A second alternative may include not recording a video program if a copy of the video program already exists at the distribution center 106.

As mentioned, the ancillary data 204 may also contain promotional material. The distribution center 106 may store the promotional material and repackage it so that it may be presented to viewers. The distribution center 106 may provide the promotional material to viewers in a passive and/or interactive manner. A passive manner may include providing the viewers with a promotional channel that provides the viewer with promotional material as one or more video programs. The promotional channel may be presented to viewers as a stream of video programs, wherein each video program is a promotion. Alternatively, the STB may present the viewer with organized list of promotional material and allow the viewer to peruse the promotional material in an interactive manner. In another alternative the promotional material may be inserted into breaks within the video programs that have been allocated for the promotional material.

In step 408, the video program is provided to viewers without first being stored (i.e. as broadcast programming) independent of steps 404 and 406. The existence of ancillary data 204 should have little or no impact on the delivery of the video program to the viewers.

In an alternative embodiment of the invention, the content provider 102 may provide video programs and instructions on when the distribution center is to deliver the stored video programs to viewers. The content provider may also provide instructions as to what channel the subscriber must tune to in order to receive the video programs. The distribution center 106 may be responsible for preparing the data stream 300 for presentation to the viewers. This is expected to further reduce, the bandwidth requirements between the content provider 102 and the distribution center 106.

The content provider 102 may provide the data stream 202 and instructions to include additional video programs that were previously recorded by the distribution center 106 as a part of the data stream 300. An aspect of the invention may include the allocation of storage, processing, transmission and/or reception bandwidth at the distribution center 106 for each individual content provider 102. The content provider 102 may be aware of the video programs that are stored at the distribution center 106. The content provider 102 may maintain a list of the video programs that it has instructed the distribution center 106 to save. Alternatively, the distribution center 106 may send the content provider 102 a list of the video programs that are currently available for inclusion in the data stream 300 that is provider to viewers.

Figure 5:
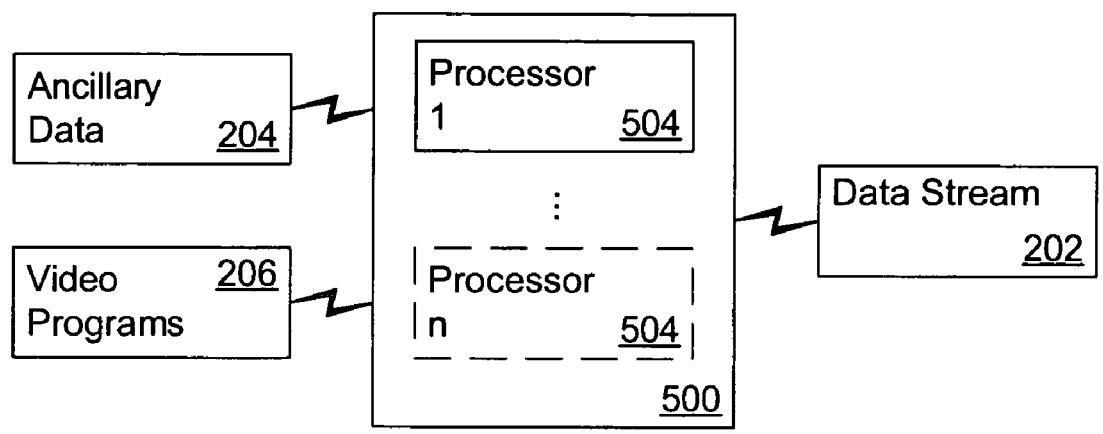
FIG. 5 is an illustration of a system for creating a data for distribution by a content provider in accordance with an embodiment of the present invention.

FIG. 5 shows a system 500 in accordance with an embodiment of the present invention. The system 500 is used by the content provider 102 to create the data stream 202. The system 500 creates the data stream 202 by combining (e.g. multiplexing) the ancillary data 204 with the video programs 206. Such a system 500 may include one or more processors 504 to perform the combining. Alternatively, the system 500 may be implemented using custom hardware.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of receiving video programming at a distribution center that provides broadcast programming and store-and-forward programming, the method comprising;

receiving one or more video programs associated with ancillary data that is time sensitive;

broadcasting one or more of the video programs to viewers as broadcast programming; and the distribution center begins recording the video programs as they are received, and determines, based on the ancillary data, if permission to record the video information is received before the broadcast is complete, and deletes, based on the ancillary data, any partially recorded portion of the video programs if the distribution center does not receive permission to record the video information before the broadcast is complete.

2. The method according to claim 1, further comprising receiving ancillary data that includes permissions for the distribution center to record one or more selected video programs of the one or more video programs wherein the permissions include limitations on the store-and-forward programming that the distribution center provides based on the selected video programs.

3. The method according to claim 2, wherein the distribution center creates auditable evidence that the distribution center has obeyed the limitations when providing the store-and-forward programming.

4. The method according to claim 1 further comprising receiving ancillary data that includes permissions for the distribution center to record one or more selected video programs of the one or more video programs wherein the ancillary data and the video programs are received multiplexed together.

5. The method according to claim 4, further comprising receiving ancillary data that includes permissions for the distribution center to record one or more selected video programs of the one or more video programs wherein the ancillary data for a selected video program and the selected video program as received are multiplexed together in a SPTS.

6. The method according to claim 4, further comprising receiving ancillary data that includes permissions for the distribution center to record one or more selected video programs of the one or more video programs wherein the ancillary data for a plurality of selected video programs and the plurality of selected video programs are received multiplexed together in a MPTS.

7. The method according to claim 1, further comprising receiving ancillary data that includes permissions for the distribution center to record one or more selected video programs of the one or more video programs wherein the ancillary data includes instructions to the distribution to record a particular video program for providing the store-and-forward programming based on the particular video program.

8. The method according to claim 1, further comprising receiving ancillary data that includes permissions for the distribution center to record one or more selected video programs of the one or more video programs wherein the distribution center broadcasts a particular recorded video program at a particular time and on a particular channel.

9. The method according to claim 1, further comprising receiving ancillary data that includes permissions for the distribution center to record one or more selected video programs of the one or more video programs wherein said receiving the ancillary data includes receiving a reference to an external server and wherein the distribution center receives the ancillary data from the external server.

10. The method according to claim 9, further comprising receiving ancillary data that includes permissions for the distribution center to record one or more selected video programs of the one or more video programs wherein the ancillary data from the external server includes updates to the permissions previously accorded to the distribution center.

11. The method according to claim 1, further comprising receiving ancillary data that includes permissions for the distribution center to record one or more selected video programs of the one or more video programs wherein the store-and-forward programming includes video-on-demand.

12. The method according to claim 1, further comprising receiving ancillary data that includes permissions for the distribution center to record one or more selected video programs of the one or more video programs wherein the store-and-forward programming includes pay-per-view.

13. The method according to claim 1, further comprising receiving ancillary data that includes permissions for the distribution center to record one or more selected video programs of the one or more video programs wherein the ancillary data gives the distribution center permission to provide the store-and-forward programming for a particular video program for a set time period.

14. The method according to claim 1, further comprising receiving ancillary data that includes permissions for the distribution center to record one or more selected video programs of the one or more video programs wherein the ancillary data specifies a price for providing the store-and-forward programming to viewers for a particular video program.

15. The method according to claim 1, wherein the distribution center allocates a specific amount of space for storing video programs for a particular provider of programming.

16. The method according to claim 1, wherein the distribution center records a particular video program before it receives permission to record the particular video program and subsequently receives ancillary data within the video program as the video program is being broadcast, the ancillary data indicating permission to record the particular video program.

17. The method according to claim 1, wherein the ancillary data further includes promotional data associated with the particular video program.

18. The method according to claim 1, wherein a particular video program among the one or more video programs are received over a secondary distribution channel as a result of a failure of the distribution center to receive or record the video program.

19. The method of claim 1, further comprising the distribution center receiving ancillary data that includes permissions for the distribution center to record one or more selected video programs of the one or more video programs a set amount of time prior to receiving the video programs.

20. A method of receiving video programming at a distribution center that provides broadcast programming and store-and-forward programming, the method comprising;
   receiving all video programs as broadcast programming associated with ancillary data that is time sensitive;
   broadcasting the video programs to viewers as broadcast programming;
   recording the video programs as they are being broadcast for later store-and-forward distribution;
   and determining, based on the ancillary data, if permission to record the video programs is received before the broadcast of the programs is complete,
   and deleting, based on the ancillary data, any partially recorded portion of the video programs if the distribution center does not receive permission to record the video programs before the broadcast is complete.

* * * * *